(12) United States Patent
March

(10) Patent No.: US 7,044,361 B2
(45) Date of Patent: May 16, 2006

(54) WALKER DISTANCE MEASURING DEVICE

(75) Inventor: Phillip March, Zeeland, MI (US)

(73) Assignee: Doctor's Orders, Inc., Zeeland, MI (US)

( * ) Notice: Subject to any disclaimer, the term of this patent is extended or adjusted under 35 U.S.C. 154(b) by 0 days.

(21) Appl. No.: 10/923,495

(22) Filed: Aug. 20, 2004

(65) Prior Publication Data

US 2005/0077345 A1    Apr. 14, 2005

Related U.S. Application Data

(60) Provisional application No. 60/496,972, filed on Aug. 20, 2003.

(51) Int. Cl.
*G01C 22/00* (2006.01)

(52) U.S. Cl. ..................... 235/95 R; 235/103

(58) Field of Classification Search ............ 235/95 R, 235/103, 105; 482/8, 136, 901, 902
See application file for complete search history.

(56) References Cited

U.S. PATENT DOCUMENTS

| | | | | |
|---|---|---|---|---|
| 4,053,755 A | * | 10/1977 | Sherrill | 235/105 |
| 4,308,665 A | * | 1/1982 | Losch | 33/781 |
| 4,334,190 A | * | 6/1982 | Sochaczevski | 324/171 |
| 4,989,342 A | * | 2/1991 | Nosek | 33/780 |
| 5,311,880 A | * | 5/1994 | Lancaster et al. | 600/595 |
| 5,551,315 A | * | 9/1996 | Pikoulas | 74/502.2 |
| 5,754,094 A | * | 5/1998 | Frushour | 340/384.7 |
| 5,767,394 A | * | 6/1998 | Butts et al. | 73/116 |
| 5,799,258 A | * | 8/1998 | Fidanza et al. | 701/1 |
| 5,893,817 A | * | 4/1999 | Morgan | 482/137 |
| 6,366,869 B1 | * | 4/2002 | Germain | 482/8 |
| 6,450,922 B1 | * | 9/2002 | Henderson et al. | 482/8 |
| 6,527,673 B1 | * | 3/2003 | Chen | 482/1 |
| 2002/0167140 A1 | * | 11/2002 | Pike et al. | 280/47.38 |

FOREIGN PATENT DOCUMENTS

| | | | | |
|---|---|---|---|---|
| GB | 2125349 A | * | 3/1984 |
| GB | 2242527 A | * | 10/1991 |
| GB | 2283820 A | * | 5/1995 |
| GB | 2286046 A | * | 8/1995 |
| JP | 2004306926 A | * | 11/2004 |

* cited by examiner

*Primary Examiner*—Uyen-Chau N. Le
(74) *Attorney, Agent, or Firm*—Watson IP Group, PLC; Jovan N. Jovanovic

(57) ABSTRACT

A walker and/or wheelchair distance measuring device comprising a wheel assembly, a measuring assembly and a display. The wheel assembly is capable of attachment to a walker, and includes a support and a wheel. The measuring assembly comprises a sensor having a trigger associated with one of the support and the wheel and a pickup associated with the other of the support and the wheel. The processor is electronically coupled with the sensor. The processor is capable of interpreting the information received from the sensor. The display is associated with the processor for displaying results computed from the processor.

7 Claims, 3 Drawing Sheets

WALKER DISTANCE MEASURING DEVICE

CROSS-REFERENCE TO RELATED APPLICATION

This application claims the benefit of U.S. Provisional Patent Application Ser. No. 60/496,972 filed Aug. 20, 2003 entitled "Walker Distance Measuring Device," the entire specification of which is hereby incorporated by reference.

BACKGROUND OF THE INVENTION

1. Field of the Invention

The present invention relates in general to medical measuring devices, and more particularly, to a walker distance measuring device, and, in turn, an associated method for measuring distances moved by patients associated with walkers.

2. Background Art

Many individuals, due to injury, ailment or age are confined to wheelchairs and/or walkers which either fully assist with transport, or which at least partially assist with movement and transportation. While such walkers and wheelchairs facilitate movement and mobility, there are certain issues which arise from the operation of same. For example, often those confined to such walkers and wheelchairs have a difficulty quantifying movement and quantifying the travel they have undertaken with the walker and/or wheelchair.

Thus, it is an object of the invention to provide a measuring device which facilitates measurement of the distance one has traveled with a walker and/or wheelchair.

Other objects will become evident in light of the specification and claims appended hereto.

SUMMARY OF THE INVENTION

The invention comprises a walker and/or wheelchair distance measuring device. The device comprises a wheel assembly, a measuring assembly and a display. The wheel assembly is capable of attachment to a walker. The wheel assembly includes a support and a wheel. The measuring assembly comprises a sensor and a processor. The sensor includes a trigger associated with one of the support and the wheel and a pickup associated with the other of the support and the wheel. The processor is electronically coupled with the sensor and the processor is capable of interpreting the information received from the sensor. The display is associated with the processor for displaying results computed from the processor.

In a preferred embodiment, the trigger is associated with the wheel and the pickup is associated with the support.

In one such embodiment, the pickup comprises a first pickup and a second trigger. The first and second triggers are positioned along the wheel spaced apart a predetermined arcuate distance from each other.

In another one such embodiment, the display is capable of displaying at least one of distance traveled, speed, total distance traveled, average speed.

In another preferred embodiment, the display comprises a LCD display.

In another preferred embodiment, the invention further comprises memory associated with the processor. The memory is capable of storing data pertaining to the movement of the walker.

In one such embodiment, the invention further comprises an output associatable with an outside device which is capable of retrieving data stored in the memory.

BRIEF DESCRIPTION OF THE DRAWINGS

The invention will now be described with reference to the drawings wherein.

DETAILED DESCRIPTION OF THE INVENTION

Figure 1:
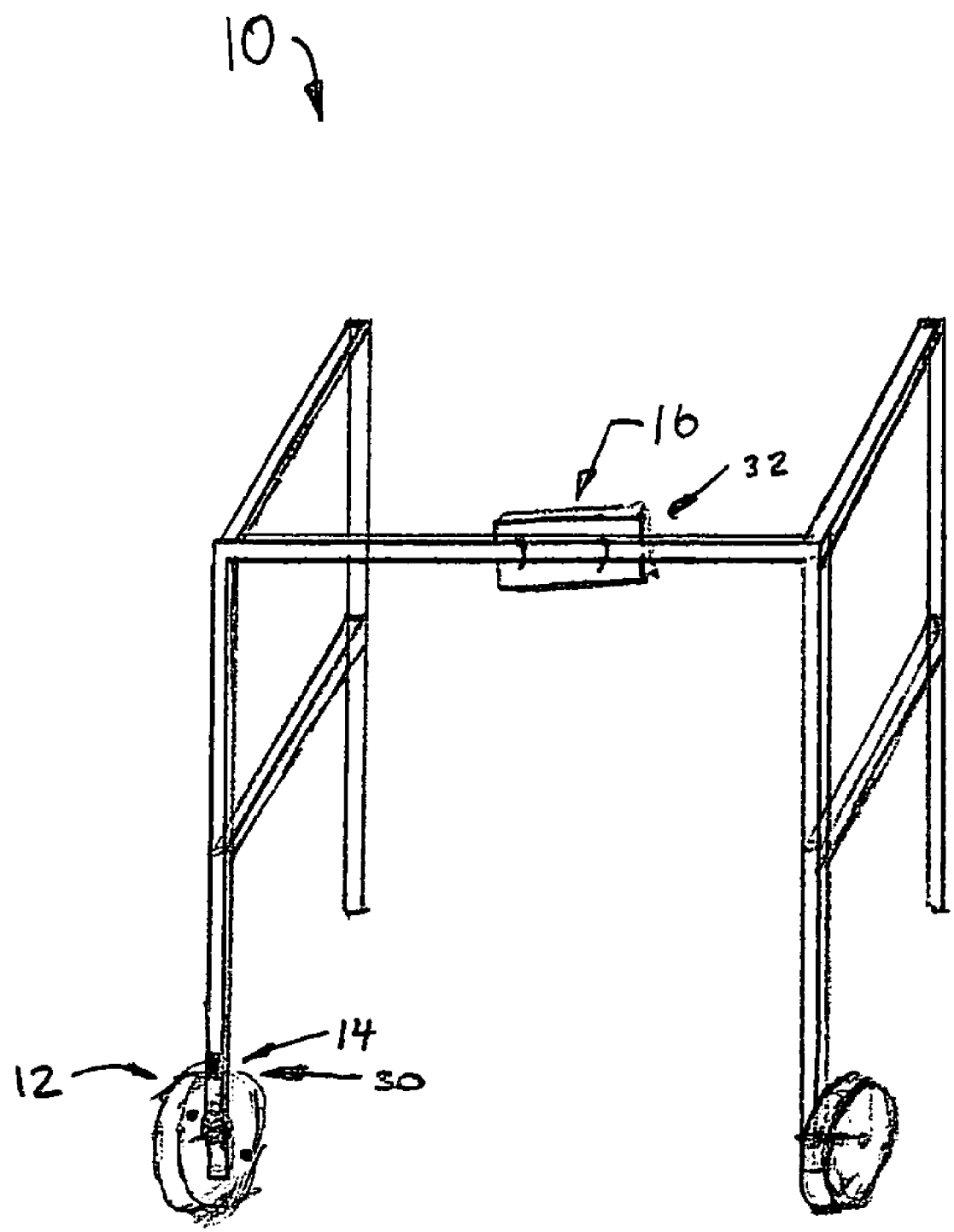
FIG. 1 of the drawings is a perspective view of the present invention associated with a walker.

While this invention is susceptible of embodiment in many different forms, there is shown in the drawings and will be described in detail, a specific embodiment with the understanding that the present disclosure is to be considered as an exemplification of the principles of the invention and is not intended to limit the invention to the embodiment illustrated.

It will be understood that like or analogous elements and/or components, referred to herein, are identified throughout the drawing by like reference characters. In addition, it will be understood that the drawing is merely a schematic representation of a first embodiment of the invention, and some of the components may have been distorted from their actual scale for purposes of pictorial clarity.

Referring now to the drawings, and to FIG. 1 in particular, walker distance measuring device 10 comprises wheel assembly 12, measuring assembly 14 and display 16. It is contemplated that the device may be a replacement part for one of the wheels of a walker, or for one of the front wheels of a wheelchair. Of course, other devices in the medical and rehabilitation field are contemplated for use.

Figure 2:
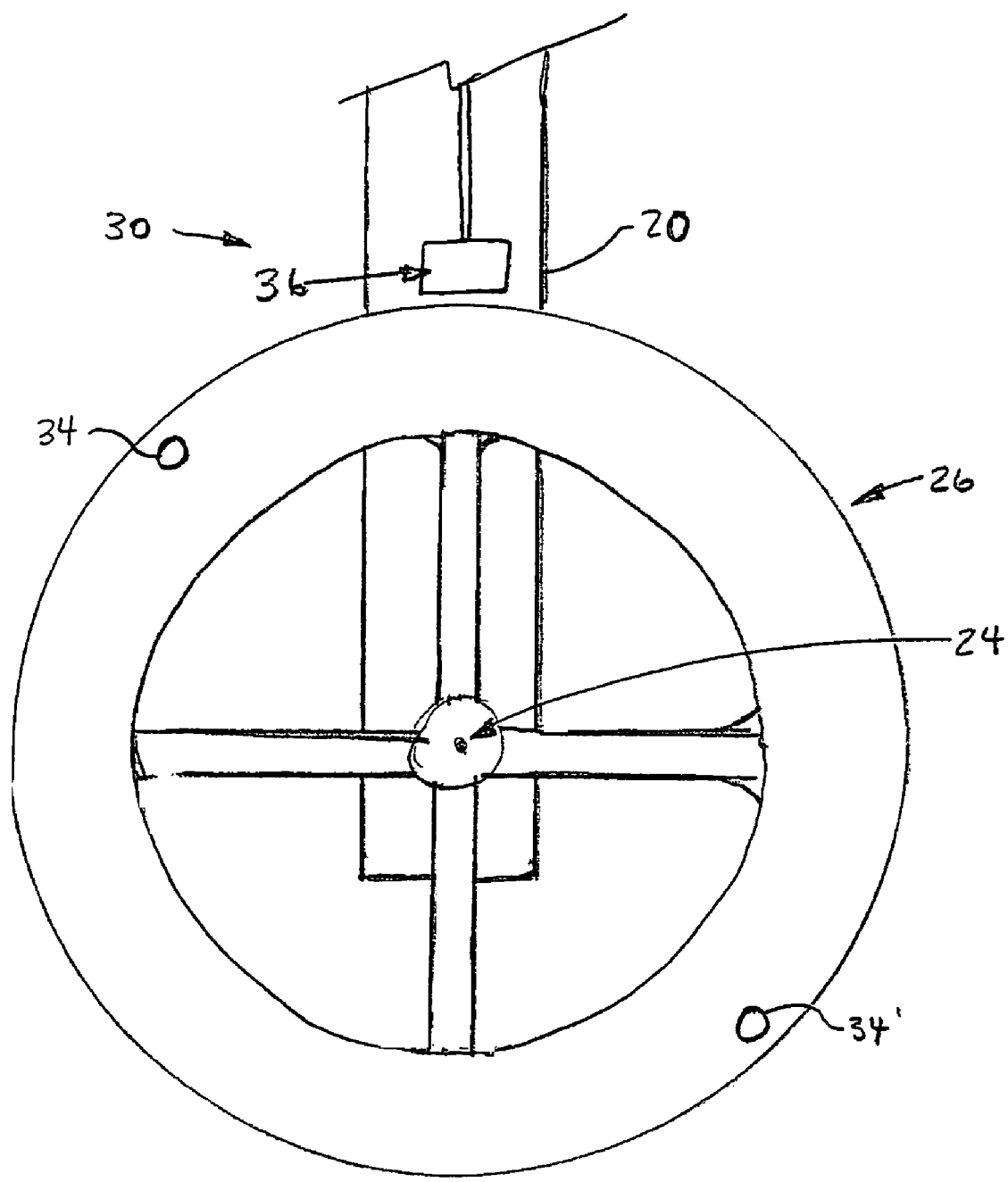
FIG. 2 of the drawings is a side elevational view of the wheel sensor assembly of the present invention.

As is shown in FIG. 2, wheel assembly comprises attachment device 20, axle 24 and wheel 26. Attachment device facilitates attachment to a walker and/or wheelchair. In the embodiment shown, the attachment device comprises a tubular member and a threaded fastener. The component of the walker or wheelchair is extended through the tubular member and then fastened with the tubular member with the threaded fastener. Of course other attachment means, and attachment assemblies are contemplated for use, including, but not limited to clamps, collars, adhesives, among others.

Axle 24 extends through the lower end of attachment device 20 capturing wheel 26 therebetween. Indeed, wheel 26 is permitted to rotate about axle 24. The wheel generally includes a wheel comprising plastic and rubber. It is contemplated that the wheel comprises a predetermined circumference, such as 6 inches in the preferred embodiment. Of course, any number of different sizes and configurations are contemplated.

Figure 3:
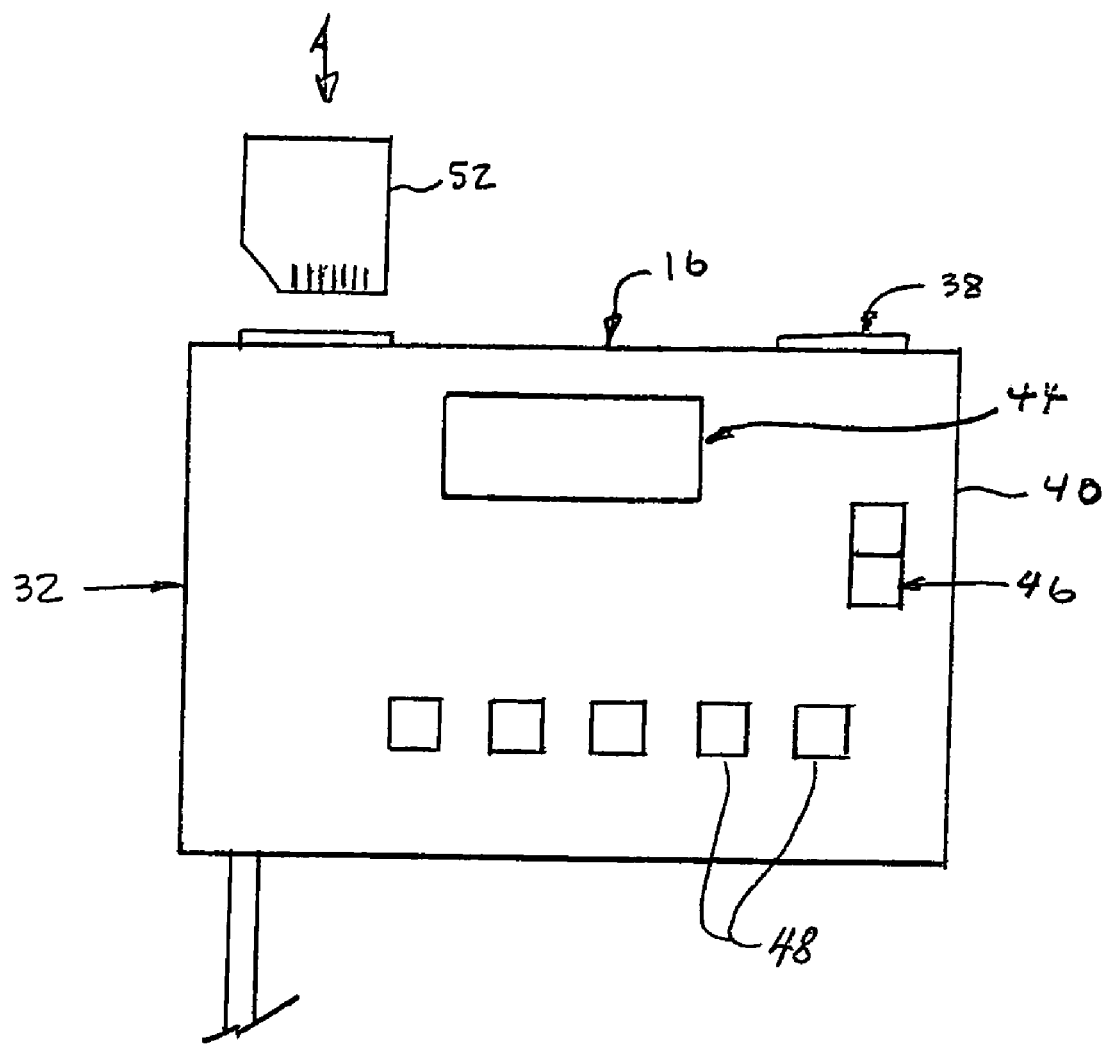
FIG. 3 of the drawings is a top plan view of the processor and the display of the present invention.

As is shown in FIGS. 1 and 3, measuring assembly 14 comprises sensor 30 and processor 32. Sensor 30 comprises a trigger members, such as trigger members 34, 34' and a pickup 36. Trigger members 34 and 34' are spaced apart from each other a predetermined arcuate distance from each other. Each trigger member is distinct in that it sends a distinct signal to pickup 36. Pickup 36 comprises a sensor that senses the passage of either trigger member beyond the pickup. To properly distinguish rocking movement of the walker versus a walking movement, a correct sequence of trigger members must be received. Repeated alternating pickup of trigger members 34, 34' characterize walking wherein erratic pickup of 34 or 34' characterize rocking or erratic movement.

Processor 32 is capable of receiving the sensor readings from sensor 30 and is capable of computing the distance traveled by the wheel's outer perimeter. The processor may be associated with volatile and/or non-volatile memory 52 so as to retain the data that is collected. The processor may be associated with output 38. Additionally, an output can be provided for transferring the data from the memory to another device, such as a PDA or a computer. In the embodiment shown, the sensor is wired to the processor which is contained within housing 40. In other embodiments, the sensor can be wirelessly associated with the processor through various means, including, but not limited to RF, Bluetooth, IR, etc.

Display 16 is shown in FIGS. 1 and 2 as comprising housing 40 having input 42, display 44, on/off switch 46 and user input switches 48. Housing 40 includes a casing which is capable of receiving and retaining the material associated with the display, and a power supply, such as a plurality of batteries. Input 42 is capable of being associated with output 38. Display 44 comprises a plurality of LED's and/or a LCD display. The display is capable of being directed by the processor to display any number of different values, including, but not limited to, distance traveled, speed, total distance traveled, average speed, etc. Indeed, the quantity and the units of that which is projected to display 44 can be varied (i.e., English units, SI units, incrementally upwardly counting, incrementally downwardly counting). User input switch 48 may be used to reset the device, or to toggle between different values which can be displayed through display 44 (i.e., to toggle between speed, average and actual speed, time, etc.). Additionally, the system can include auto off, auto on and sleep. Significantly, the system can auto activate from a sleep or off position by a realization of a rotation in excess of a full turn, or two full turns (whereas the system will remain off when less motion is realized—it may be interpreted to be inadvertent movement, rocking, etc.)

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A walker and/or wheelchair distance measuring device comprising:
   a wheel assembly configured for attachment to a walker or a wheelchair, the wheel assembly having a support and a wheel;
   a measuring assembly comprising:
      a sensor having a plurality of trigger members associated the wheel and a pickup associated with the support, the plurality of trigger members being spaced apart from each other, and each trigger member having a distinctive signal;
      a processor electronically coupled with the sensor, the processor configured for interpreting the information received from the sensor; and
   a display associated with the processor for displaying results computed from the processor.

2. The distance measuring device of claim 1 wherein the display is configured for displaying at least one of distance traveled, speed, total distance traveled, average speed.

3. The distance measuring device of claim 1 wherein the display comprises a LCD display.

4. The distance measuring device of claim 1 further comprising memory associated with the processor, the memory configured for storing data pertaining to the movement of the walker.

5. The distance measuring device of claim 4 further comprising an output associatable with an outside device which is configured for retrieving data stored in the memory.

6. A walker and/or wheelchair distance measuring device comprising:
   a wheel assembly configured for attachment to a walker or a wheelchair, the wheel assembly having a support and a wheel;
   a measuring assembly comprising:
      a sensor having a plurality of trigger members associated the wheel and a pickup associated with the support, the plurality of trigger members being spaced apart from each other along the wheel;
      a processor electronically coupled with the sensor, the processor configured for interpreting the information received from the sensor; and
      means associated with one of the sensor and the processor for discerning between a rocking movement and a walking movement; and
   a display associated with the processor for displaying results computed from the processor.

7. The distance measuring device of claim 6 wherein the discerning means comprises a distinction between the first trigger and the second trigger.

* * * * *